Dec. 6, 1927.

H. W. MEYER

FLUSHING SYSTEM

Filed Aug. 9, 1926

1,652,038

INVENTOR.
HENRY W. MEYER.
BY
ATTORNEYS.

Patented Dec. 6, 1927.

1,652,038

UNITED STATES PATENT OFFICE.

HENRY W. MEYER, OF INDIANAPOLIS, INDIANA.

FLUSHING SYSTEM.

Application filed August 9, 1926. Serial No. 128,057.

This invention relates to a flushing system for irrigation and the like lines.

The chief object of the invention is to provide an irrigation line with an automatic flush valve whereby the system will permit of flushing and permit of operation without removal of said valve or manual actuation thereof.

The chief feature of the invention consists in the particular formation of the valve and its association in an irrigation system, whereby said system will, under normal conditions, be self-cleaning, self-draining and self-flushing and under other normal conditions will permit of irrigation.

Figure 1:
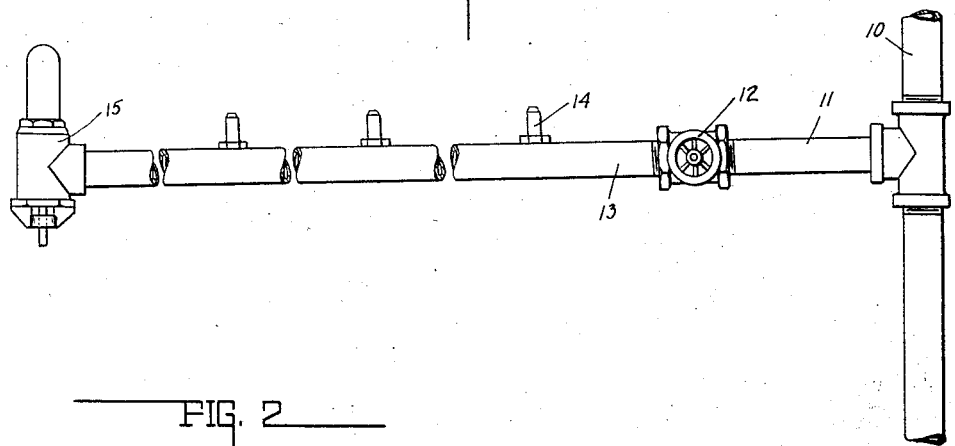
Figure 2:
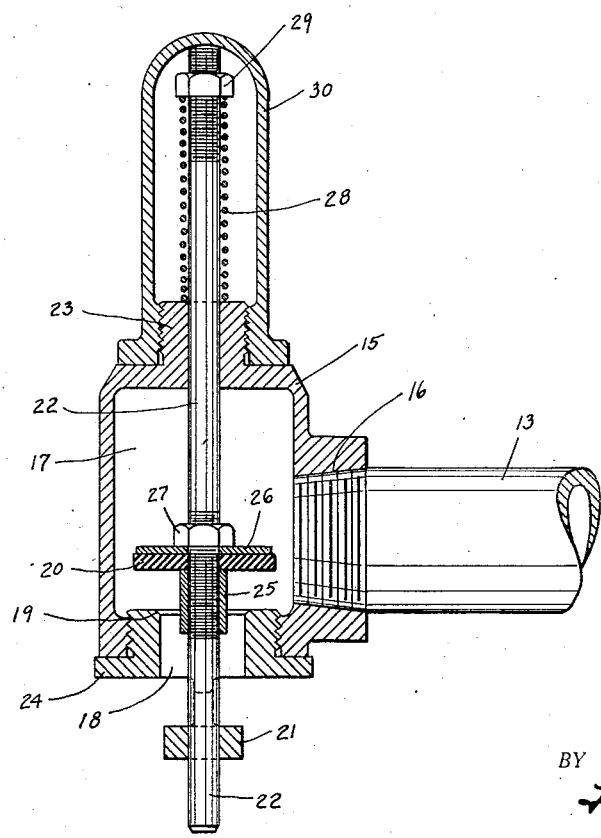

The full nature of the invention will be understood from the accompanying drawings and the following description and claims:

In the drawings Fig. 1 is an elevational view of a simplified form of irrigation system including the automatic flush valve. Fig. 2 is a central sectional view of the flush valve.

In the drawings 10 indicates a header and a branch 11 controlled by valve 12 communicating with irrigation conduit 13 including a plurality of discharge outlets or nozzles 14 which herein are shown positioned above the bottom of the conduit 13 and herein are specifically shown positioned at the top of the conduit. Conduit 13 is inclined from the supply end to the low pressure end which supports a valve 15. Valve 15 includes an opening 16 receiving the conduit 13 and by which said conduit communicates with a valve chamber 17 having a transversely positioned opening 18 communicating therewith, said opening being defined by a seat 19. Mounted within the chamber is a valve 20 for engaging seat 19 and closing opening 18. A suitable guide 21 aligns one end of the stem 22 carrying valve 20 and the bearing 23 closing the opposite end of the chamber also aligns said stem. To permit removal of the valve the cap portion 24 is provided which includes the seat 19 and the opening 18 defined thereby. The valve 20 is adjustably mounted on stem 22 and herein said stem is shown comprised of two parts connected by a coupling 25 and the valve is adjustably mounted by engaging the end of the coupling 25 and being retained in position by a washer or disc plate 26 and the locking nut 27. The projecting end of the stem 22 is surrounded by a coil spring 28, the tension of which is adjusted by a retaining and adjusting nut 29. A suitable cap 30 has threaded engagement with the valve body and encloses the aforesaid and serves as a stop.

The operation of the irrigating system is as follows: When it is desired to irrigate greenhouses or culture plots water is supplied under pressure to branch 11 by line 10 and when the valve 12 is opened the pressure discharges through nozzles 14 provided the end of the conduit 13 is closed. Heretofore it has been the practice to provide a plug or a valve at the end of this line for the purpose of draining the line and for the purpose of cleaning the line. Water usually contains considerable sediment and this is deposited in the conduit 13 if the line were not drained or flushed. The aforesaid operation if line 13 is a long one and it generally is, requires movement of the operator from one end of the conduit to the other and then back again. The present invention is automatic and requires only the operation of the valve 12, the same being as follows:

When the valve 12 is partially cracked or opened, low pressure liquid is applied to conduit 13 and runs down along the bottom thereof and since valve 20 is normally maintained in the position shown in Fig. 2 by spring 28, the water or liquid discharges through opening 18, thus flushing line 13. When it is desired to irrigate, valve 12 is opened wide and full liquid pressure is applied to conduit 13 which as soon as the stream of water rises above the level of the valve 20 as shown in Fig. 2, serves to create a pressure thereon tending to close said valve in opposition to spring 28 and as the pipe 13 fills under pressure, chamber 17 fills under pressure and valve 20 is seated. When this occurs the liquid such as water, is projected from the nozzles 14 under great pressure and serves for irrigating and at the same time cleans said nozzles of any collection that might have been included therein. When the desired amount of irrigation has occurred valve 12 is closed which reduces pressure in line 13 and the spring 28 raises said valve and permits the escape of water in chamber 17 and pipe 13, thereby draining the line, thus eliminating the greater portion of the possibility of deposition or sedimentation of said line 13. When it is desired to clean line 13, valve 12 is maintained in partially cracked or open position as previously indicated.

The invention claimed is:

1. An automatic flush valve comprising an integral chambered body portion including a pair of communicating transverse openings connected by the chamber therein, a valve rod coaxial with one of said openings and extending through said chamber and projecting beyond the same and slidably supported thereby, a spring concentric with the rod and normally projecting the rod in one direction, a cap supported by the body and engageable by the projected end of said rod for limiting the spring actuated movement thereof and completely enclosing the projected end of the rod, a valve seat concentric with the rod and positioned in the rod receiving opening below the level of the transverse opening, and valve means supported by the rod between the valve seat and the transverse opening and normally maintainable by the spring in elevated position from said seat and above the lowermost level of the transverse opening.

2. A device as defined by claim 1, characterized by the valve seat including an extension projecting beyond the chamber for slidably supporting said rod to guide the same.

3. A device as defined by claim 1, characterized by the spring enclosed portion and the valve supporting portion of said rod being threaded, and means associated with each threaded portion and the spring and valve respectively for adjusting the tension and position thereof respectively.

4. A device as defined by claim 1, characterized by the valve seat being annular and lying in a plane transverse to the valve movement, and the valve including an annular sealing cushion backed by a supporting disc at least equal to the valve opening.

In witness whereof, I have hereunto affixed my signature.

HENRY W. MEYER.